(12) United States Patent
Bill

(10) Patent No.: US 11,753,185 B2
(45) Date of Patent: Sep. 12, 2023

(54) AIRCRAFT BRAKING SYSTEM

(71) Applicant: Airbus Operations Limited, Bristol (GB)

(72) Inventor: Andrew Bill, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 407 days.

(21) Appl. No.: 16/850,680

(22) Filed: Apr. 16, 2020

(65) Prior Publication Data

US 2020/0339284 A1    Oct. 29, 2020

(30) Foreign Application Priority Data

Apr. 23, 2019   (GB) ...................................... 1905677

(51) Int. Cl.
| | | |
|---|---|---|
| *F16D 65/092* | (2006.01) | |
| *B64F 5/40* | (2017.01) | |
| *B64C 25/44* | (2006.01) | |

(52) U.S. Cl.
CPC .............. *B64F 5/40* (2017.01); *F16D 65/092* (2013.01); *B64C 25/44* (2013.01)

(58) Field of Classification Search
CPC ......... B64F 5/40; B64C 25/44; B64C 25/445; B64C 25/46; F16D 65/092; F16D 55/02; F16D 55/025; F16D 55/24; F16D 55/40; F16D 55/36
USPC ...................................... 188/72.1, 71.5, 72.4
See application file for complete search history.

(56) References Cited

U.S. PATENT DOCUMENTS

| | | |
|---|---|---|
| 1,977,981 A | 10/1934 | Bates |
| 2,199,785 A | 5/1940 | Dickson |
| 2,555,182 A | 5/1951 | Butler |
| 2,672,220 A | 3/1954 | Collier |
| 2,706,018 A | 4/1955 | Du Bois |
| 2,854,098 A | 9/1958 | Griswold |

(Continued)

FOREIGN PATENT DOCUMENTS

| | | |
|---|---|---|
| EP | 0 037 919 | 10/1981 |
| EP | 0 465 564 | 7/1993 |

(Continued)

OTHER PUBLICATIONS

United Kingdom Combined Search and Examination Report for GB 1905677.9, dated Oct. 18, 2019, 6 pages.

(Continued)

*Primary Examiner* — Thomas W Irvin
(74) *Attorney, Agent, or Firm* — Nixon & Vanderhye P.C.

(57) ABSTRACT

A routine maintenance procedure performed in respect of a wheel of an aircraft landing gear is disclosed. Consumable brake lining material is integrated with the wheel. Retreading or replacing the wheel tyre and inspecting or replacing the consumable brake lining material tyre are performed at the same successive intervals as part of the routine maintenance procedure. The sum volume and mass of brake material present on the aircraft may thus be reduced. Brake material providing for the demands of a maximum energy rejected take-off may be provided separately. The wheel may be made in one or two parts from carbon-fibre composite material. At least some of the brake material may be provided on an outwardly facing planar surface of the wheel.

14 Claims, 8 Drawing Sheets

(56) References Cited

U.S. PATENT DOCUMENTS

| | | | | |
|---|---|---|---|---|
| 4,207,968 | A | * | 6/1980 | Chamberlain ........... F16D 55/40 |
| | | | | 188/72.3 |
| 4,659,040 | A | | 4/1987 | Sinclair |
| 4,742,895 | A | * | 5/1988 | Bok ........................ F16D 55/36 |
| | | | | 188/196 R |
| 4,923,056 | A | | 5/1990 | Nedelk |
| 5,088,662 | A | | 2/1992 | Appleberry |
| 6,615,958 | B1 | | 9/2003 | Baden |
| 9,593,726 | B2 | * | 3/2017 | Chambard .............. B64C 25/44 |
| 10,131,329 | B1 | * | 11/2018 | Georgin ................... B60T 8/174 |
| 11,320,010 | B2 | * | 5/2022 | Deng ...................... F16D 55/40 |
| 2005/0056499 | A1 | | 3/2005 | Narcy et al. |
| 2011/0005870 | A1 | * | 1/2011 | Baumgartner ........... F16D 55/36 |
| | | | | 188/71.5 |
| 2015/0337915 | A1 | * | 11/2015 | Chambard .............. F16D 55/24 |
| | | | | 188/71.5 |
| 2018/0079402 | A1 | * | 3/2018 | Brüggemann .......... B64C 25/42 |
| 2019/0263510 | A1 | * | 8/2019 | Bill ......................... F16D 66/00 |
| 2021/0310528 | A1 | * | 10/2021 | Deng ...................... F16D 55/36 |

FOREIGN PATENT DOCUMENTS

| | | |
|---|---|---|
| EP | 1 510719 | 3/2005 |
| EP | 1 704 087 | 2/2018 |
| GB | 615743 | 1/1949 |
| GB | 690581 | 4/1953 |
| GB | 2 074 262 | 10/1981 |
| GB | 2527650 | 12/2015 |
| JP | 08-175133 | 7/1996 |

OTHER PUBLICATIONS

United Kingdom Search Report for GB 1905677.9, dated Feb. 27, 2020, 2 pages.
United Kingdom Search Report for GB 1905677.9, dated Mar. 18, 2020, 2 pages.
United Kingdom Search Report for GB 1905677.9, dated Mar. 18, 2020, 1 page.
United Kingdom Search Report for GB 1905677.9, dated Mar. 20, 2020, 2 pages.
United Kingdom Search Report for GB 1905677.9, dated Mar. 25, 2020 1 page.
United Kingdom Search Report for GB 1905677.9, dated Mar. 26, 2020, 2 pages.
Partial European Search Report for European Application No. 20170474.9, 12 pages, dated Sep. 17, 2020.
Partial European Search Report for Application No. 22206506.2, 13 pages, dated Jan. 17, 2023.
Extended European Search Report for Application No. 22206506.2, 13 pages, dated Apr. 11, 2023.

* cited by examiner

AIRCRAFT BRAKING SYSTEM

CROSS RELATED APPLICATION

This application claims priority to United Kingdom (GB) Patent Application 1905677.9, filed Apr. 23, 2019, the entire contents of which is hereby incorporated by reference.

BACKGROUND OF THE INVENTION

The present invention concerns an aircraft braking system and aircraft wheels with integrated brake assemblies. More particularly, but not exclusively, this invention concerns particular arrangements of an aircraft wheel and associated brake assembly and methods of maintaining the same. The invention also concerns a method of braking, and other subject matter as described and claimed herein.

It is known in the prior art to provide a brake assembly as part of an aircraft wheels. Many such proposals have been made including for example those disclosed in U.S. Pat. Nos. 2,854,098 and 2,672,220. The wheels of such systems tend to be heavy. There is a general desire to reduce unnecessary mass on an aircraft so as to increase fuel efficiency, for example. The brake assemblies integrated with the wheels in many of the prior art proposals are complicated. There is also a general desire to enable efficient maintenance of an aircraft during its lifetime.

The present invention seeks to mitigate one or more of the above-mentioned problems. Alternatively or additionally, the present invention seeks to provide an improved aircraft wheel and/or braking system associated with such a wheel which for example allows for mass reduction. Alternatively or additionally, the present invention seeks to provide an improved aircraft wheel and/or braking system associated with such a wheel which for example allows for more efficient maintenance. Alternatively or additionally, the present invention seeks to provide an improved way of performing maintenance of an aircraft wheel and/or braking system associated with such a wheel.

SUMMARY OF THE INVENTION

The present invention provides, according to a first aspect, a method of performing a routine maintenance procedure in respect of a wheel of an aircraft landing gear. The wheel comprises a tyre and consumable brake lining material (i.e. as a part of the wheel). The method comprises re-treading or replacing the tyre at successive intervals as part of the routine maintenance procedure. The method also comprises inspecting or replacing the consumable brake lining material tyre at the same successive intervals. Thus, in certain embodiments of the invention, the routine maintenance of the tyre is synchronised with the routine maintenance of the brake lining material on the wheel. In embodiments of the invention, this removes the need for a separate, potentially independent and unsynchronised, maintenance schedule for the brake material. In embodiments of the invention, the routine maintenance required on the aircraft may be reduced and/or replaced at least in part by maintenance of wheels when removed from the aircraft, thus increasing operational efficiency. The frequency of brake inspections may be increased resulting in earlier detection of maintenance issues, in addition to the need to replace or replenish brake material.

It will be understood that it is within the scope of the present invention to both inspect and then replace at least some of the consumable brake lining material tyre at the end of a single maintenance interval whilst only re-treading or replacing the tyre once.

It will be understood that the routine maintenance of the wheel and/or of brake linings, brake assemblies or the like is the maintenance that is performed at set minimum periods or operating cycles or the like. Other non-routine maintenance may be performed as and when required in response to exceptional events, for example following an emergency of some sort. It may be that the successive intervals are dictated by a maximum number of cycles permitted between successive maintenance procedures. It may be that the successive intervals are set by requiring maintenance as soon as practical after a set number of cycles. The number of cycles may be set so as to achieve uninterrupted operation between scheduled maintenance periods. In embodiments of the invention, the number of cycles of operation of the aircraft between one routine maintenance and the next may be at least 100. The number of cycles of operation of the aircraft between one routine maintenance and the next may be more than 200, and optionally may be fewer than 500. The mass of consumable brake lining material carried by each landing gear may be reduced. The mass of consumable brake lining material used between successive inspections of the consumable brake lining material may be reduced. The mass of consumable brake lining material carried by each wheel may correspond to an amount set by the shorter intervals between successive maintenance procedures. It may be that at least a quarter, preferably at least a third, and possibly the majority, of the consumable brake lining material is used over five successive intervals (the consumable brake lining material used may, for example, be deemed to be the difference in the mass of consumable brake lining material forming part of the wheel when at an initial, peak, level and the mass immediately before the fifth re-treading/replacing of a tyre on the wheel as part of the routine maintenance procedure). It may be that the routine maintenance procedure is performed in respect of multiple wheels, each comprising a tyre and consumable brake lining material as a part of the wheel. The method may be so performed that in respect of a sample of fifty steps of replacing the consumable brake lining material (the fifty steps optionally being a series of steps performed successively at the same location and/or for the same fleet of aircraft—but optionally being a random sample) at least five of those steps correspond to the majority of the consumable brake lining material having been used over the previous five successive intervals (or, optionally, if the brake lining material is replaced sooner than within five successive intervals, at least five of those steps correspond to the majority of the consumable brake lining material having been used since the previous replacement of brake material). It may be that the majority of the consumable brake lining material is used for about 10% of the time (over five successive maintenance intervals). The consumable brake lining material may be replaced less frequently than every routine maintenance procedure, and optionally less frequently than every other routine maintenance procedure. The consumable brake lining material may be replaced more frequently than once every twenty routine maintenance procedures, on average, and optionally more frequently than every ten routine maintenance procedures. The mass of the consumable brake lining material used over the course of five successive intervals (i.e. five tyre retreads/changes) may be in the range of 3 kg to 20 kg (optionally 4 kg to 15 kg), per wheel, and possibly greater than 5 kg. The mass of the consumable brake lining material used before the consumable brake lining material is replaced may be in the range of 3 kg to 20 kg, per wheel, and possibly greater than 5 kg. The mass of the consumable brake lining material immediately after the step of replacing the consumable brake lining material may be in the range of 5 kg to 25 kg, per wheel, optionally greater than 10 kg, and possibly in the range of 12 kg to 20 kg.

The aircraft brake mechanism may comprise a stator-rotor arrangement. It may be that at least part of the consumable brake lining material of the wheel forms part of a stator and/or a rotor of the stator-rotor arrangement, for example the rotor and/or stator may be lined with brake material. A braking force may be applied to the wheel by means of urging the stator-rotor arrangement together. This may be caused by activation of a braking actuator. The wheel may be configured such that consumable brake lining material of the wheel forms part only of an aircraft brake mechanism for the wheel. Other parts of the aircraft brake mechanism may be provided at a location other than on the wheel. For example, a brake actuator may be mounted on the landing gear structure, for example, being mounted on landing gear structure adjacent to the wheel. A housing associated with the brakes (for example a braking actuator housing) may be may be mounted on the landing gear structure.

It may be that the consumable brake lining material which is part of the wheel has insufficient heat capacity, by itself, to meet the demands of a maximum energy rejected take-off (MERTO). This may lead to a less massive amount of brake material on the wheel, but may as a consequence require further brake material elsewhere on the aircraft. Additional brake lining material may be provided on a brake mechanism, or part thereof, mounted on the landing gear structure adjacent to the wheel. The additional brake lining material may be configured, whether or not in combination with the consumable brake lining material provided as a part of the wheel, to meet the demands of a MERTO. It may be that the additional brake lining material has a different servicing interval. For example, while the brake material on the wheel may be subject to frequent routine maintenance, synchronised with tyre re-treading/replacement, the brake material provided to meet the demands of a MERTO may need servicing only infrequently and/or after a MERTO event has occurred. The additional brake lining material may be bigger, having a greater mass and/or volume, preferably more than 150% as compared to, that of the consumable brake lining material provided as a part of the wheel.

It may be that the consumable brake lining material which is part of the wheel is configured to have sufficient heat capacity (for example in view of the thermal properties of the rest of the wheel and/or brake arrangement) to meet the demands of a maximum energy rejected take-off. It may be that substantially all of the brake lining material required to provide braking to the wheel when in use on the aircraft is provided as part of the wheel. This may be achieved by having a brake pack which is fully integrated into the wheel structure. It will be appreciated that such a brake pack may be removably fixed in the wheel, to allow routine maintenance. The mounting of the brake pack in the wheel is such that removal of the wheel from the axle of the landing gear also causes removal of the brake pack integrated into the wheel. The wheel may have internal structure that facilitates the fixing of at least part of an integrated brake pack.

In certain embodiments of the invention, the consumable brake lining material is directly attached to, or is integrally formed with, a surface of the body of the wheel. For example an outward facing, preferably substantially planar, surface of the wheel may be lined with, or otherwise formed of, brake material.

The wheel typically has a hub arranged for rotation about a wheel axis, and a rim connected to the hub by structure. The rim is shaped and configured to receive a tyre, the structure between the hub and rim, extending radially therebetween. There may be a first end structure extending radially from the hub, and a second end structure extending radially from the hub, the second end structure being spaced apart from the first end structure in a direction along the wheel axis. In such a case, the tyre when mounted on the wheel occupies at least part of the space between the first end structure and the second end structure. It may be that at least some of the consumable brake lining material is attached to an outwardly facing surface of one or both of the first and second end structures.

The consumable brake lining material in or on the wheel may be planar (i.e. flat) for more than two thirds of the surface area it covers (or optionally for the majority of the surface area it covers). Preferably, such consumable brake lining material is substantially planar, on its outwardly facing surface, for substantially the entire surface area it covers. In the case where the brake material is provided directly on a surface of the wheel, and there is a well-defined boundary between the brake material and the wheel, it is preferred that that the majority of (optionally more than two thirds of, and possibly substantially the entirety of) the surface defined by that boundary is substantially planar. It will be understood that there may be regions of the wheel and/or brake material that are not strictly planar, for example to allow for the brake material to be keyed into the wheel surface. The outwardly facing shape of the aircraft wheel in such a case would have an appearance significantly different from conventional aircraft wheel shapes in order to provide the dual function of wheel and support for brake material.

It will be understood that the main body of the wheel comprises the hub, the rim and the structure that connects the rim to the hub. The main body of the wheel would not typically include any nuts, bolts, inserts, hubcaps or the like. The wheel, or part of it, for example the main body may be made from a composite material. For example, the majority of the volume of the material from which the main body of the wheel is made may be a composite material. Such a composite material may be in the form of a carbon fibre composite material, for example CFRP (carbon fibre reinforced polymer). Alternatively, the majority of the volume of the material from which the main body of the wheel is made may be an aluminium alloy material, for example a lightweight aluminium alloy material suited for aerospace use. The main structure of the wheel may be made from a small number (one or two, for example) of monolithic parts. For example, at least 75% of the volume of (optionally substantially the entire volume of) the main body of the wheel may be formed from one or two monolithic wheel portions. The main structure of the wheel may be in the form of a single monolithic carbon fibre wheel body.

According to a second aspect of the invention there is also provided an aircraft wheel and a brake assembly. The aircraft wheel and brake assembly may be configured, or otherwise suitable, for use in the method of the first aspect of the invention as claimed or described herein. The wheel may be supplied with, or without, its tyre. The aircraft wheel and a brake assembly may comprise a first portion and a second portion configured such that the first portion of the brake assembly is provided as part of the wheel and the second portion of the brake assembly is provided for mounting on landing gear structure adjacent to the wheel. In such a case, it may be that the first portion is operable, for example separately from the second portion, to provide braking and dissipate energy at a first level. Both the first portion and second portion may additionally be operable together to provide braking and dissipate energy at a second level, the second level being higher than the first. For example, the first portion may be operable during normal braking requirements, whereas the first and second portions are able to meet the demands of a MERTO event, such an event requiring braking at a level beyond which the first portion alone could provide. The first portion of the brake assembly may be lighter than the second portion of the brake assembly. The first portion of the brake assembly may have a first mass of consumable brake lining material, the mass for example being at least 1 kg (optionally greater than 5 kg). The second portion of the brake assembly may have a second mass of consumable brake lining material, the second mass being greater than the first mass, for example being more than 150% of the first mass. It may be that the aircraft wheel and the brake assembly are arranged to apply braking in response to a received braking demand such that below a first threshold level of braking demand, the first portion applies braking to the wheel but the second portion either does not apply braking to the wheel or applies braking at a lower level. It may also be the case that above a second threshold level of braking demand, the second threshold level being the same as or higher than the first threshold level, the first portion applies braking to the wheel and the second portion applies more braking to the wheel. For example, below the first threshold level of braking demand, the first portion applies braking to the wheel but the second portion does not apply braking to the wheel, and above that same threshold level (i.e. the second threshold level being equal to the first threshold level) of braking demand, both the first and second portions apply braking to the wheel. A device may be provided which, when the brake pressure is above a threshold, transfers pressure in a way that causes the actuation of the second portion of the brake assembly and below that threshold transfers pressure in a way that causes the actuation of the first portion, not the second portion, of the brake assembly. A pressure transfer mechanism may be provided in order to enable that, or a similar, function. The pressure transfer mechanism may be provided at least partly as part of the second portion. The first portion may comprise at least one stator and at least one rotor. The second portion may comprise at least one stator and at least one rotor. It may be that the rotors and stators of the first and second portions are arranged in series. The first portion and the second portion of the brake assembly may be arranged to be activated by the same actuator.

According to a third aspect of the invention, there is provided a method of braking in response to a rejected take-off of an aircraft. Such a method may comprise use of the wheel and brake assembly as claimed or described herein. The method includes applying braking to a wheel on a landing gear of the aircraft using a brake pack that forms an integrated part of the wheel and also using a brake pack that is mounted on the landing gear but which does not form an integrated part of the wheel. It will be understood that the brake pack that forms an integrated part of the wheel is configured such that on removal of the wheel from the landing gear the brake pack remains as part of the wheel, whereas the brake pack on the landing gear remains on the landing gear when the wheel is so removed. The brake pack forming part of the wheel may be inspected at the same time as the tyre of the wheel is subject to routine maintenance, whereas the brake pack on the landing gear would normally be inspected in situ. The first brake pack may have less brake material than the second brake pack. It may be that the first and second brake packs are arranged to provide braking of the wheel by the first brake pack only (i.e. the first brake pack being active and the second brake pack being inactive).

There is provided in accordance with a fourth aspect of the invention an aircraft wheel which comprises consumable brake lining material directly attached to, or integrally formed with, an outwardly facing surface of the wheel. For example, the consumable brake lining material may be on the outwardly facing surface of an end structure of the wheel, the end structures being those which extend radially outwardly from the hub, and between which the tyre sits. The brake material may be on one or both of the outwardly facing surfaces of the two end structures of the wheel. The aircraft wheel and integrated brake lining material may be provided with an integrated brake assembly structure or applying a braking force to the wheel by means of frictional engagement with the braking line material on the wheel. At least part of the wheel, for example the majority (optionally substantially all) of the wheel body may be provided in only one or two monolithic portions. The brake material attached to or forming part of the wheel may be mechanically attached directly on the body of the wheel.

There is provided in accordance with a fifth aspect of the invention an aircraft wheel and a brake assembly, wherein the brake assembly comprises a first part and a second part positioned and configured such that the wheel is disposed directly between the first part and second part. For example the first part may comprise at least one of a disc of brake material and a disc-shaped pressure plate. The second part may comprise a disc of brake material. Braking of the wheel may be affected by means of urging the first part towards the second part, thus causing brake friction directly between the wheel and at least the second part. In embodiments of the invention, at least one said disc of brake material is directly attached to, or is integrally formed with, an outwardly facing surface of the main body of the wheel.

The present invention also provides an aircraft landing gear assembly and/or an aircraft including a wheel and associated brake assembly as described or claimed herein. The aircraft may be a commercial passenger aircraft, for example an aircraft capable of carrying more than fifty passengers, for example more than one hundred passengers. The aircraft may be a single aisle aircraft. Certain embodiments of the present invention have particular application in relation to an aircraft having a maximum take-off weight (MTOW) of less than 140 tonnes, optionally less than 120 tonnes and possibly less than 100 tonnes. Such aircraft may typically have a MTOW which is sufficiently low enough to enable the aircraft's weight to be supported by only three landing gear each carrying two wheels, being typically a nose landing gear and two symmetrically arranged main landing gear. Such a six-wheel arrangement can be found on Airbus' A320 aircraft for example.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which.

DETAILED DESCRIPTION

Figure 1:
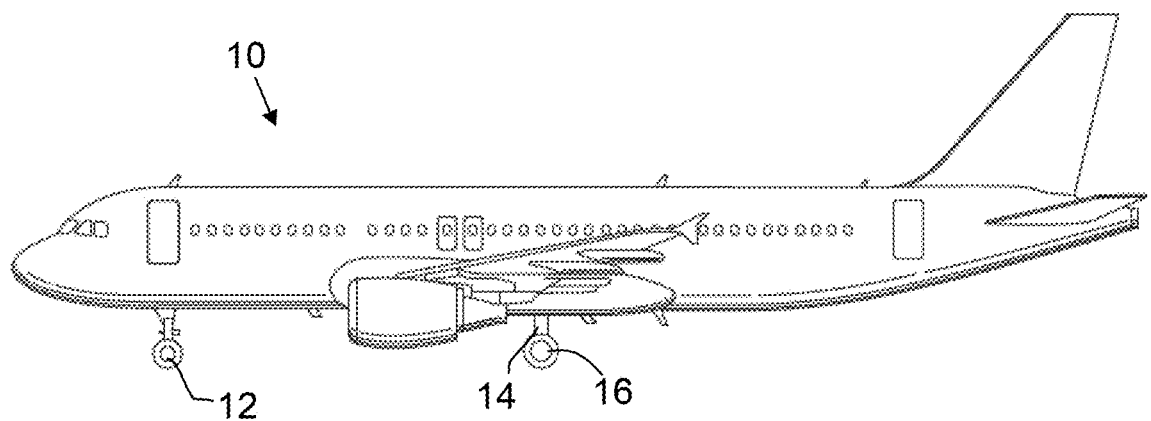
FIG. 1 is a side view of an aircraft including a wheel on a main landing gear according to a first embodiment of the invention.
Figure 2:
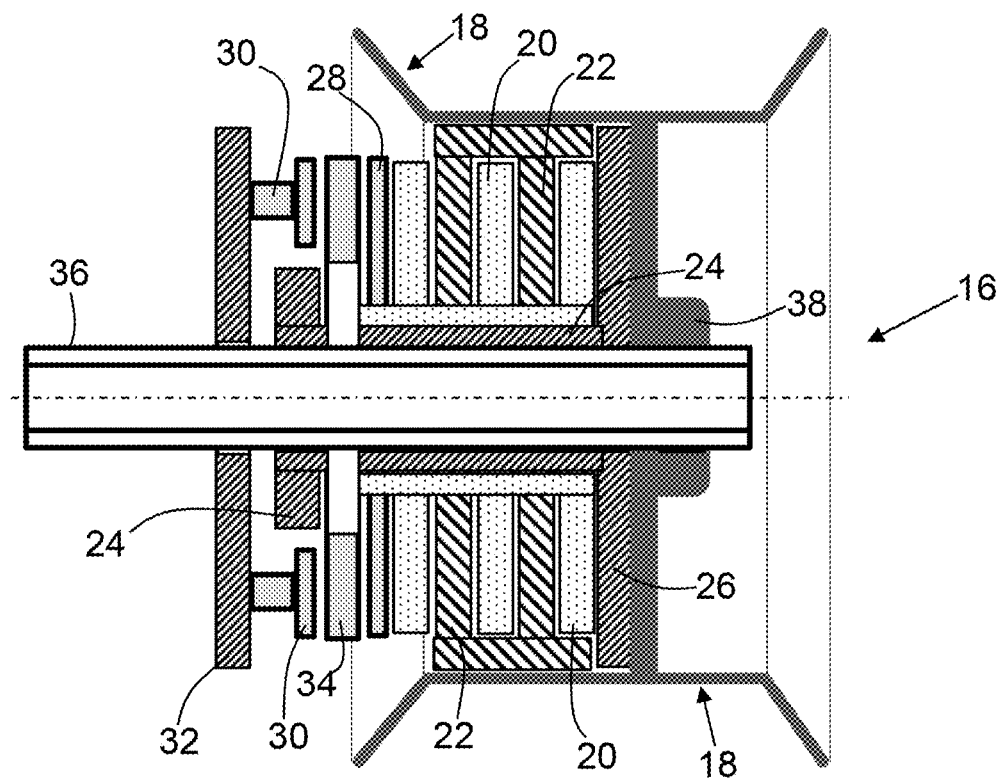
FIG. 2 is a cross-sectional side view of the wheel of the first embodiment (omitting the tyre)

The first embodiment of the invention relates to a method of performing routine maintenance in respect of the wheels of the main landing gear of an aircraft. The wheels are each provided with their own integrated brake pack, as will now be described with reference to FIGS. 1 to 3. FIG. 1 shows an aircraft 10 with a nose landing gear 12 and two main landing gears 14 (only one of which being visible in FIG. 1). Each main landing gear 14 comprises two wheels 16, one of which is shown in cross-section in FIG. 2. The aircraft thus has six wheels in total. The wheel 16 of FIG. 2 comprises a rim 18 on which a tyre is mounted (the tyre being shown in FIG. 1, but not shown in FIG. 2). The brake pack comprises a set of stators 20 and an interleaved set of rotors 22. The stators 20 are keyed to a torque tube 24 which in use is held stationary as the wheel rotates. The rotors 22 are keyed to the wheel (and thus rotate with the wheel). One end of the torque tube 24 has a reaction plate 26, which is located at one end of the arrangement of stators 20 and rotors 22. A brake retention plate 28 is provided at the opposite end of the arrangement of stators 20 and rotors 22. The brake pack is arranged to provide braking to the rotating wheel by means of a brake piston 30 (provided with housing 32) pushing a thrust plate 34 against the brake retention plate 28, which in turn pushes the stators 20 and rotors 22 together, against the reaction force provided by the reaction plate 26. In this case each stator 20 is lined on both sides with a consumable brake lining material. The wheel is shown in FIG. 2 mounted on an axle 36. The wheel has a hub 38 and bearing assembly (not shown separately) which is mounted for rotation about an axle 36. In use, the torque tube 24, including its associated reaction plate 26, is bolted to the axle—or otherwise fixed in position relative to the axle 36. The brake piston housing 32 and thrust plate 34 are attached to landing gear structure (not shown).

Figure 3:
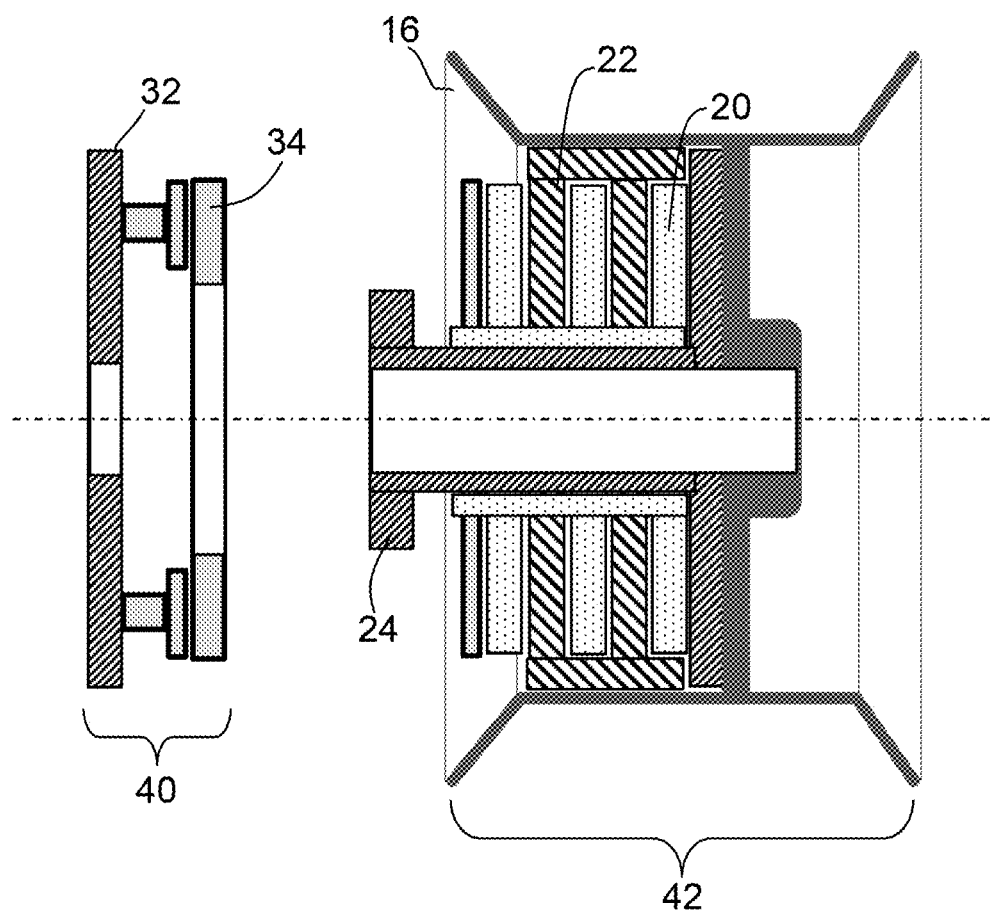
FIG. 3 is a cross-sectional side view of the wheel of FIG. 2, but showing two parts of the wheel separated from each other.

As shown in FIG. 3, the wheel and brake assembly have two distinct sub-assemblies: a first sub-assembly 40 being mounted on the landing gear and comprising brake piston housing 32 and thrust plate 34; and a second sub-assembly 42 being mounted on the axle and comprising the wheel 16 and its integrated torsion tube 24 and brake parts (including stators 20 and rotors 22).

Figure 4:
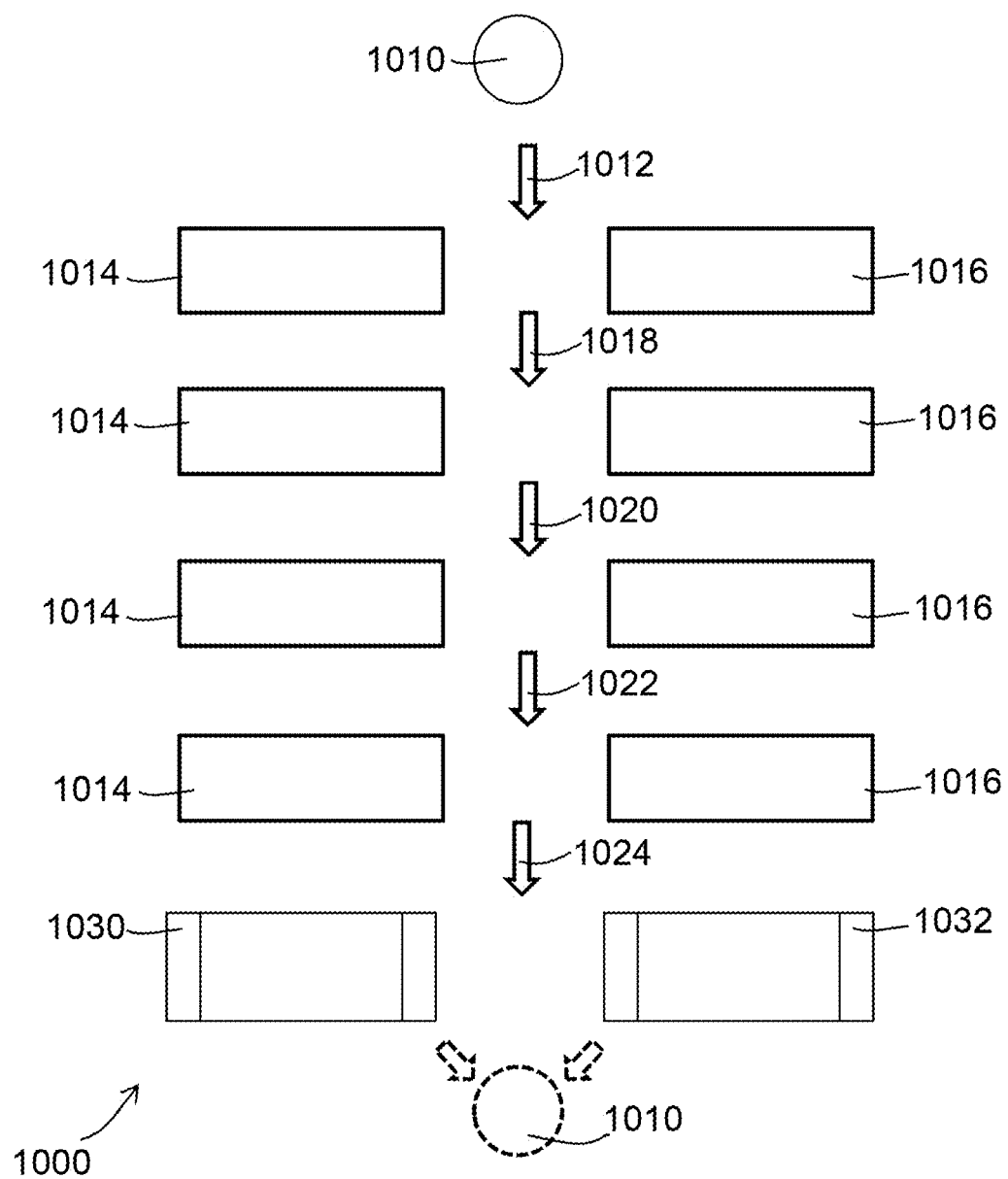
FIG. 4 is a flow diagram representing the steps of a method of maintenance performed in respect of the first embodiment of the invention.
Figure 5:
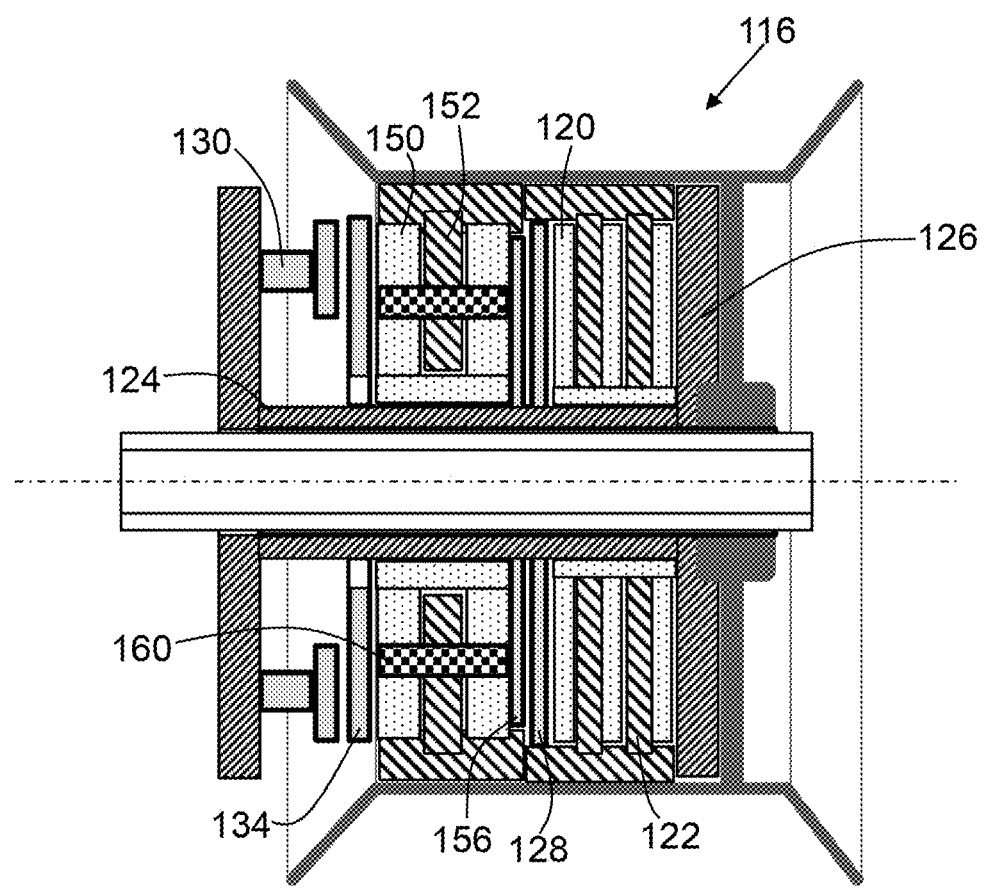
FIG. 5 is a cross-sectional side view of a wheel according to a second embodiment of the invention.

FIG. 4 is a flowchart illustrating the procedure 1000 employed, in accordance with the first embodiment, to maintain the wheel shown in FIGS. 1 to 3. Initially (1010) the wheel starts being used on an aircraft and has a new tyre and a newly lined (with brake material) integrated brake pack. All of the brake lining material required to provide braking to the wheel when in use on the aircraft is provided as part of the wheel. After an interval (represented by arrow 1012) of a number of cycles of operation of the aircraft wheel (each cycle comprising a take-off, flight and consequent landing) the tyre is re-tread (1014) and the brake lining inspected and renewed/replaced, as necessary (1016). The number of cycles may be a set number for example 400 cycles or could alternatively be that number of cycles reached when the tyre is sufficiently worn to warrant a wheel change. This embodiment assumes that the interval is ~400 cycles, but it will be appreciated that many other maintenance intervals are possible and that there need not be exactly the same number of cycles between successive wheel changes when performing routine maintenance. The brake pack is inspected by removing the rotors and stators from the interior of the wheel/torque tube. If insufficient brake lining is left, then the brake lining is renewed and/or a replacement stator/rotor with sufficient brake material is swapped in. The same steps of re-treading the tyre 1014 and inspecting/renewing the brake lining 1016 are conducted after further successive intervals 1018, 1020, 1022 of 400 cycles. (It will be appreciated that the wheel when removed from the aircraft is typically replaced with a different wheel, and the wheel once serviced is typically subsequently used on a different aircraft.) Thus, there is a routine maintenance procedure by which the inspecting and replacing of the consumable brake lining material is synchronised with the re-treading of the tyre. This is in part enabled by the increased frequency of inspecting of brake material, which might normally be done only every 2000 cycles or so, and at a different time and/or location typically from re-treading of the tyre. As a result of the increased frequency of brake lining maintenance less brake material is provided per wheel. In this case, the mass of brake material per wheel that is initially provided may be about 20 kg (compared to a typical amount of 35 kg), resulting in a mass saving (4 brake sets per aircraft) of about 60 kg. The typical wear of brake material is, on average, about 8 kg per 2000 cycles (just under half of the available brake material being used over the course of five routine maintenance cycles). It may be that the mass of brake material used varies according to the type of operating schedule of the aircraft. It would typically be desirable of course for sufficient brake material to be provided that there is no risk of all brake material being used as between routine maintenance intervals (assuming standard and unexceptional operation of the aircraft) but nevertheless to reduce the mass of the brake material needed/provided. It may be that the majority of the consumable brake lining material is used for at least 10% of the time (over the course of five successive routine maintenance cycles). After about 2000 cycles (the fifth successive interval—arrow 1024) the tyre is replaced (box 1030) and the brake pack is fully inspected (box 1032). The cycle then repeats. It may be that case that in about one in ten times the brake material is replaced (i.e. 10% of the such occurrences), which may occur as frequently as (or less frequently than) tyre replacements (i.e. not merely retreads), more than half of the brake material by mass has been used. This may equate to about 60 mm wear depending of course on the geometry and shape of the brake material. Such wear could be judged by taking a sample of 50 occurrences of the brake material being replaced and finding that at least 5 such occurrences correspond to more than half of the mass of brake material having been consumed.

The provision of a wheel with its own mass of brake material which is inspected more frequently than convention brake systems allows the mass of brake material on the aircraft as a whole to be reduced. It also means that the aircraft operator would not need to inspect brake systems on the aircraft as often—the main inspections can be performed during shop maintenance of the wheel. Such inspections may comprise wear pin checks for example. As such operating costs may be reduced. It is also possible that the inspection of brakes at every wheel change might also enable earlier identification of problems with the brakes that might otherwise cause an operational interrupt if allowed to go undetected for a longer time.

A wheel and associated brake assembly according to a second embodiment is illustrated by FIGS. 5 to 9. Like parts are labelled with reference numbers using the identical last two digits. Similarly to the first embodiment, the wheel 116 is provided its own integrated brake pack comprising a set of stators 120, keyed to a torque tube 124, and an interleaved set of rotors 122, keyed to the wheel. In this embodiment however, the brake pack integrated with the wheel is less massive than in the first embodiment, but as a consequence an additional brake pack is provided separately from the wheel. The wheel's brake pack will be referred to the as the inner brake pack, whereas the additional brake pack will be referred to as the outer brake pack. The outer brake pack forms part of the sub-assembly mounted on the landing gear. The stators 120 and rotors 122 of the inner brake pack are sandwiched between a torque tube reaction plate 126 and a brake retention plate 128. The outer brake pack comprises a pair of larger stators 150, between which sits a single larger rotor 152. The larger stators 150 are keyed, via intermediate structure, to the torque tube 124. The single larger rotor 152 is keyed to the wheel. The rotor-stator set of the outer brake pack is disposed between an intermediate reaction plate 156 and a thrust plate 134. The rotor-stator set of the outer brake pack is provided in series with the rotor-stator set of the inner brake pack.

The outer brake pack also includes a pressure transfer device 160 which is provided in parallel with the rotor and stator arrangement of the outer brake pack. Below a first threshold brake pressure applied by the brake piston 130, the pressure transfer device 160 compresses, if at all, by a negligible amount such that substantially all of the brake pressure applied is delivered to the inner brake pack. Above a second higher threshold brake pressure, the pressure transfer device 160 undergoes significant compression such that the brake pressure applied is also delivered to the rotor and stator arrangement of the outer brake pack. The inner and outer brake packs are configured such that the outer brake pack is rarely used during normal operation of the aircraft. The inner brake pack is sized to cope with all normal braking requirements, other than a maximum energy rejected take-off. The braking that is required in the event of a maximum energy rejected take-off requires dissipation of a large amount of heat energy, typically requiring a larger volume of brake material to cope with the heat generated. The brake material of the outer brake pack, in combination with the inner brake pack, provide sufficient heat capacity to meet the demands of a maximum energy rejected take-off (MERTO). The mass of brake material in the inner brake pack is about 8 kg, whereas the mass of the brake material of the outer brake pack is about 15 kg (i.e. about twice as much). Whereas in this embodiment the consumable brake lining material of the inner brake pack has, by itself, insufficient heat capacity to meet the demands of a MERTO, in the first embodiment the brake material which is part of the wheel is configured to have sufficient heat capacity to meet the demands of a MERTO. At a certain braking demand, the inner brake pack will apply braking to the wheel with minimal braking being applied, if any, by the outer brake pack. In the event of a MERTO (i.e. at a higher braking demand), the outer brake pack will apply significantly greater braking (in terms of the rate of energy dissipated by the brake pack) than the inner brake pack.

The routine maintenance of the tyre and of the brake material carried by the wheel itself may be carried out in much the same way as the method shown in FIG. 4 (in that the brake material is checked at every tyre re-tread interval). A MERTO is a rare event and one that would typically necessitate a non-routine maintenance check to be performed as soon as practicable after such an event. If no MERTOs have occurred then the regular maintenance of the outer brake pack may be undertaken less frequently than the maintenance interval that would typically be employed for a conventional brake pack sized and configured for normal braking and exceptional braking in the event of a MERTO. The replacement of the brake material on the outer brake pack may for example be required less often, given the regular replacement/checking of the brake material provided as part of the routine maintenance of the inner brake pack.

Figure 6:
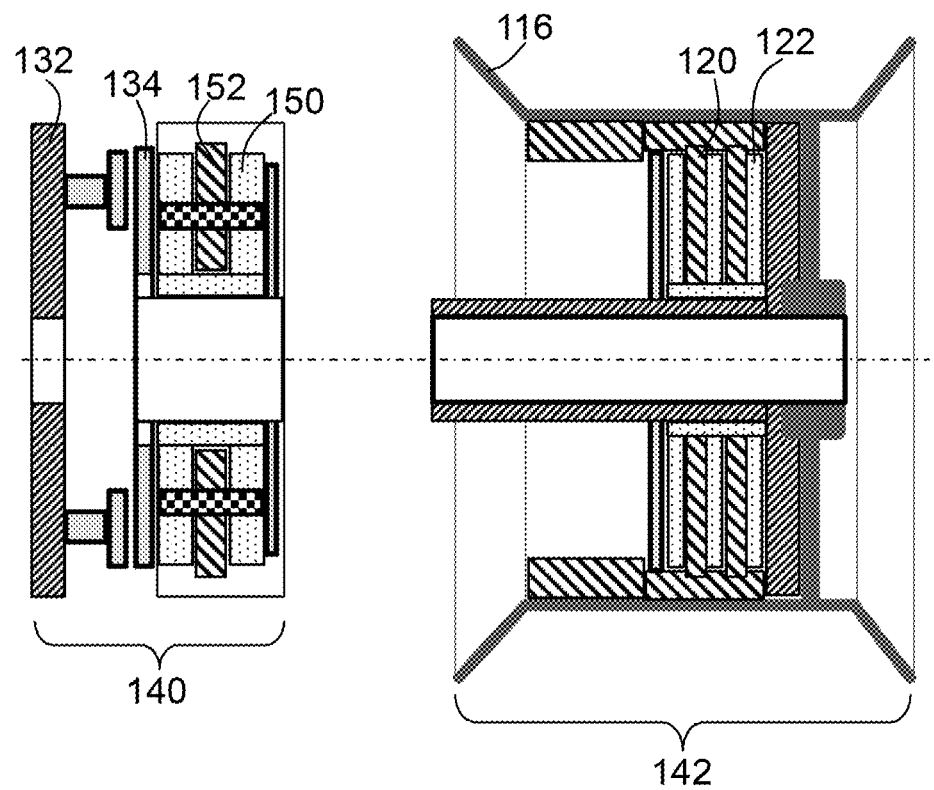
FIG. 6 is a cross-sectional side view of the wheel of FIG. 5, but showing two parts of the wheel separated from each other.

The two distinct sub-assemblies of the second embodiment are shown in FIG. 6. There is a first sub-assembly 140 mounted on the landing gear which comprises the outer brake pack (including stators 150 and rotor 152), the brake piston housing 132 and the thrust plate 134. There is also a second sub-assembly 142 which comprises the wheel 116 and the inner brake pack (including stators 120 and rotors 122).

Figure 7:
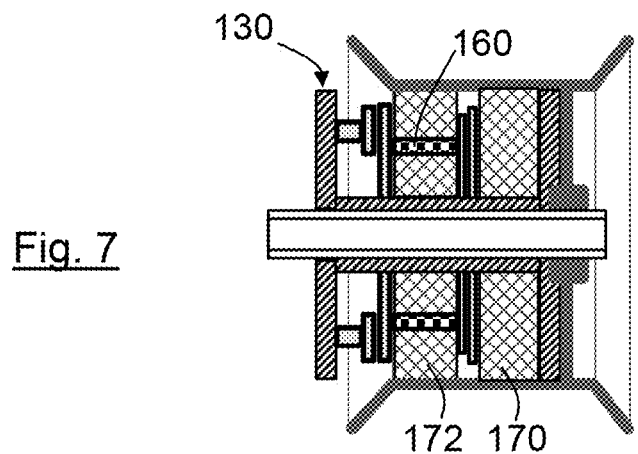
FIGS. 7, 8, and 9 show the wheel according to the second embodiment during various states of braking/not braking.
Figure 8:
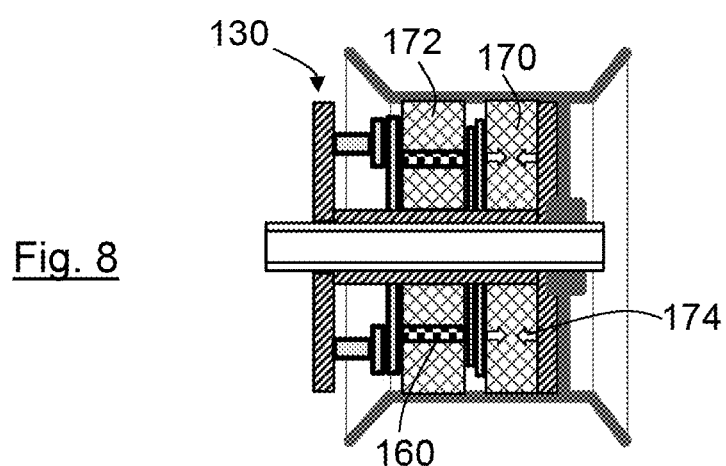
Figure 9:
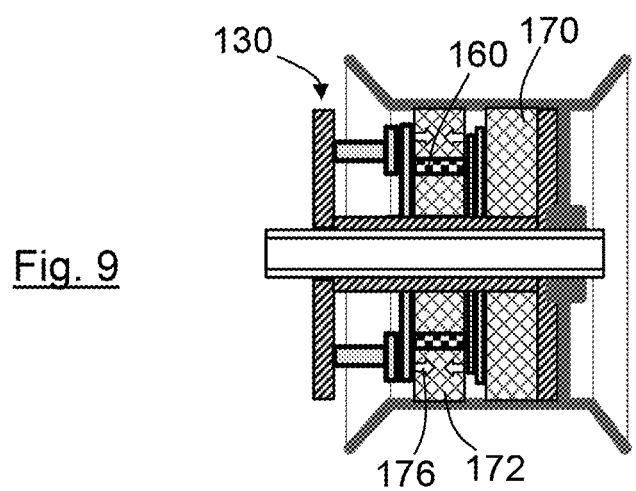

Operation of the wheel and brake assembly will now be described with reference to FIGS. 7 to 9. FIG. 7 shows the case where no braking is applied by the actuator 130. The inner brake pack on the wheel (comprising stators 120 and rotors 122 shown in FIGS. 5 and 6) is indicated with reference numeral 170. The outer brake pack on the landing gear (comprising stators 150 rotors 152 shown in FIGS. 5 and 6) is indicated with reference numeral 172. A normal level of braking being applied by the actuator 130 is shown in FIG. 8. In this case, the inner brake pack 170 is engaged (shown schematically by arrows 174), the pressure transfer device 160 is effectively inactive and the outer brake pack 172 is thus inactive. During emergency braking (such as in the event of a MERTO), increased pressure is applied by the actuator 130 as shown in FIG. 9. The increased pressure applied by the actuator 130, causes the pressure transfer device 160 to allow pressure to be delivered to the outer brake pack 172 (as shown schematically by arrows 176). Both the inner brake pack 170 and the outer brake pack 172 are fully engaged.

Figure 10:
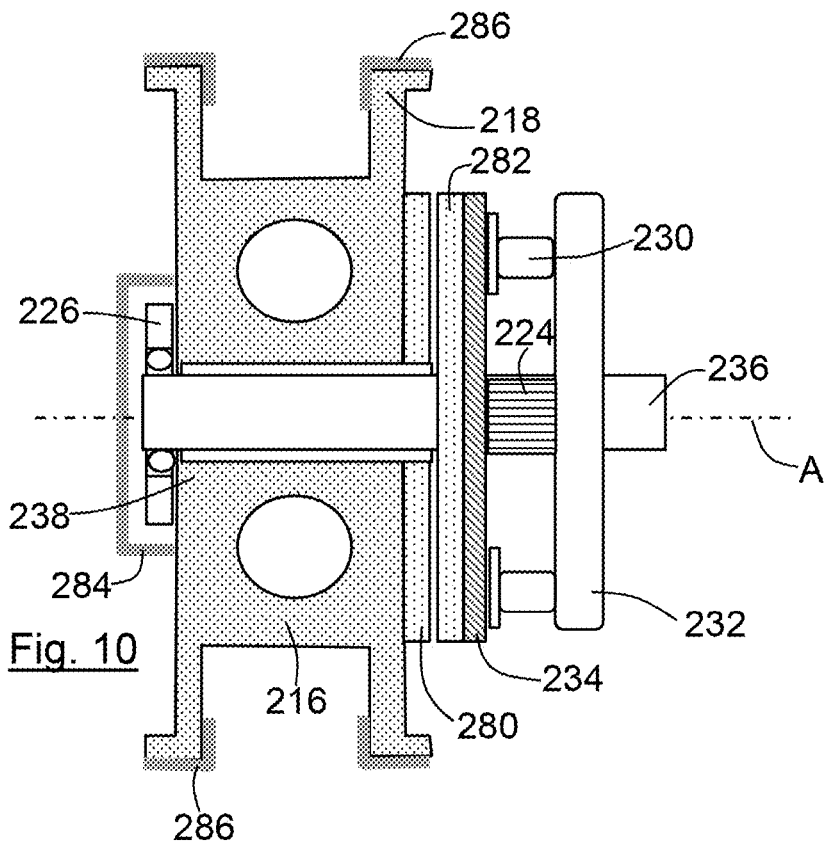
FIG. 10 is a cross-sectional side view of a wheel according to third embodiment of the invention.
Figure 11:
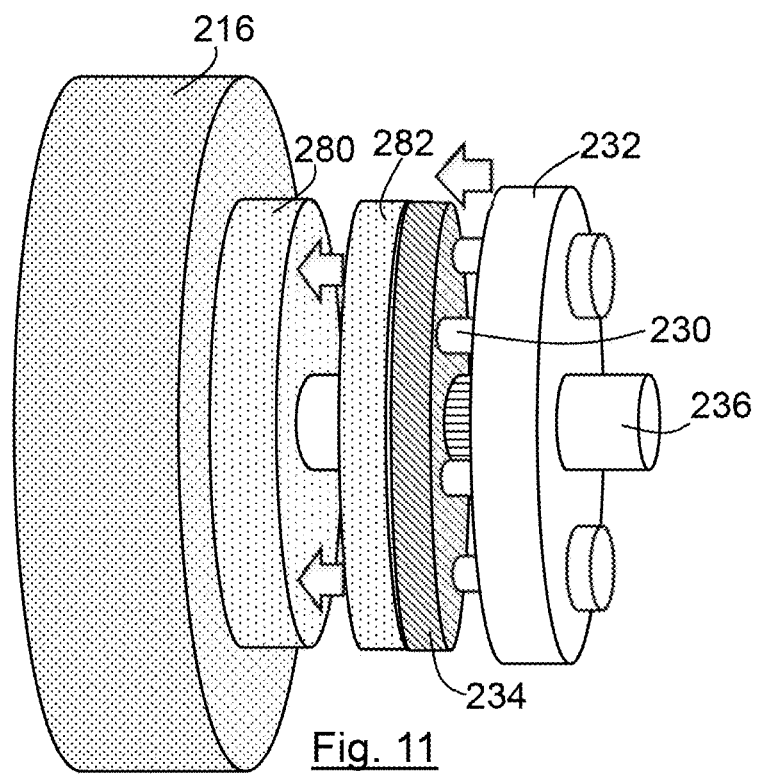
FIG. 11 is an part-exploded perspective view of the wheel of FIG. 10.

A wheel and associated brake assembly according to a third embodiment is illustrated by FIGS. 10 and 11. Like parts are labelled with reference numbers using the identical last two digits. FIG. 10 is a cross-sectional view whereas FIG. 11 is a schematic exploded view. Similarly to the first embodiment, the wheel 216 is provided with its own integrated set of brake lining material. In this embodiment however, the consumable brake lining material 280 is directly attached to a surface of the body of the wheel, in this case on the inboard side of the wheel. The wheel body itself is a monolithic carbon fibre composite structure and is thus able to act as a heat sink when the brake lining material 280 is heated through friction. The wheel 216 has a hub 238 which is mounted for rotation about an axle 236 about the wheel axis (labelled A in FIG. 10). FIG. 10 additionally shows a hub cap 284. The wheel has an outboard end extending radially from the hub to the rim 218 at the outboard end, and an inboard end extending radially from the hub to the rim 218 at the inboard end. A tyre is mounted (the tyre not being shown in FIG. 10) on the rim 218 between the inboard end of the wheel and the outboard end. The rim 218 is provided with thermal barriers 286 to protect the tyre when the wheel heats up. The wheel assembly includes a splined torque tube 224 which in use is held stationary as the wheel rotates. Braking is provided to the rotating wheel 216 by means of a set of brake pistons 230 (mounted to the landing gear via housing 232) pushing a pressure plate 234 against the brake lining 280 which forms part of the wheel (the brake material being provided as an integral part of the outward facing surface of the inboard end of the wheel). The pressure plate 234 is also lined with brake material 282. It will be seen that both brake linings 280, 282 are entirely planar (i.e. the brake lining is planar for all of the surface of the wheel covered by the brake material) and have a surface area that is greater than 50% of the available surface area of the planar outward facing surface of the inboard end of the wheel.

When pistons 230 are actuated the rotating brake lining 280 and the non-rotating brake lining 282 are pressed against each other, the force from the pressure 234 being reacted against by a disc-shaped reaction plate 226 at the outboard side of the wheel. The wheel is shown in FIGS. 10 and 11 as mounted on an axle 236. By using the heat capacity of the carbon wheel as a heat sink, the amount of carbon brake material required may be reduced. The mass of the carbon brake lining may be significantly reduced whilst still providing the capability of effective braking in the event of a MERTO. The brake material required for 100% braking of the wheel is all provided as an integral part of the wheel. This enables the simplified and synchronised routine maintenance procedures in respect of both tyre and brakes.

Figure 12:
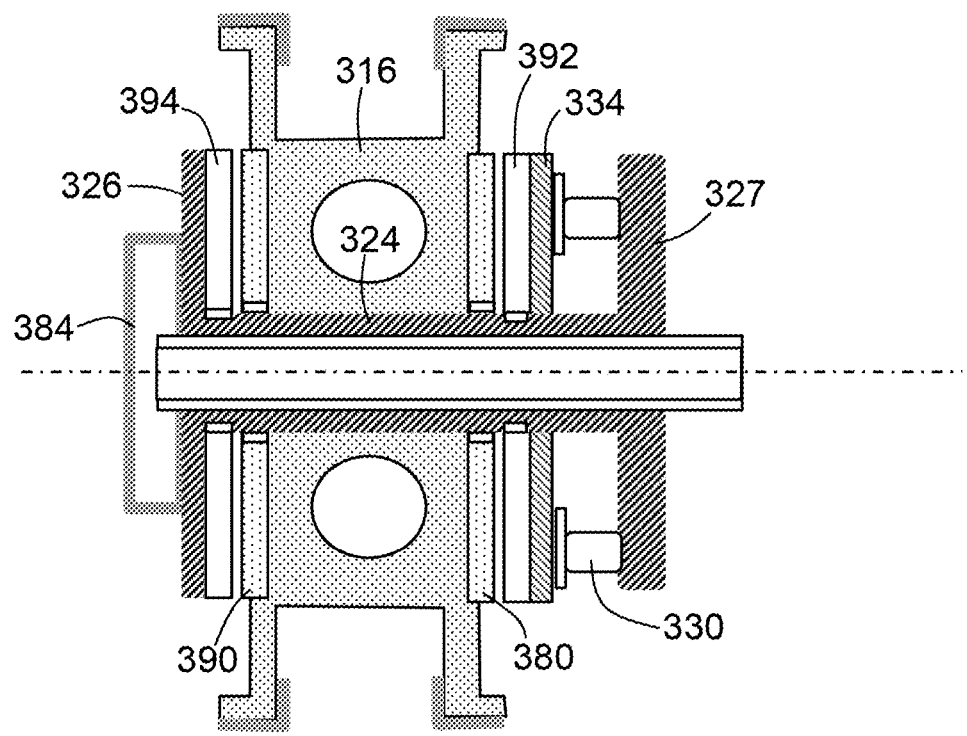
FIG. 12 is a cross-sectional side view of a wheel according to third embodiment of the invention.

A wheel and associated brake assembly according to a fourth embodiment is illustrated by FIG. 12, which can be compared and contrasted with the wheel and associated brake assembly according to the third embodiment as shown in FIG. 10. Like parts are labelled with reference numbers using the same last two digits. Similarly to the third embodiment, there is consumable brake lining material 380 directly attached to a surface of the inboard end structure of a carbon wheel. The main difference is that the outboard end structure of the wheel is also lined with brake material 390. This improves braking force and reduces excessive heat build-up in either set of brake discs. Also the brake material on the wheel is formed by mechanically attaching the brake material directly on the body of the wheel.

The torque tube 324 has an outboard reaction plate 326 at the outboard end and an inboard reaction plate 327 at the inboard end. An inboard pressure plate 334, keyed to the torque tube and lined with brake material 392, engages with the disc of brake material 380 on the inboard end of the wheel when braking is applied. An outboard reaction plate 326 of the torque tube 324 is lined with brake material 394 engages with the disc of brake material 390 on the outboard end of the wheel when braking is applied. Braking is provided to the rotating wheel 316 by means of a set of brake pistons 330 (mounted to the landing gear via the inboard reaction plate 327 of the torque tube 324) pushing the brake linings 380, 392 together and brake linings 390, 394 together. The brake forces are reacted in a closed-loop mechanical couple, which is provided by the end plates 326, 327 of the torque tube, such that the brake forces are not passed through the wheel to the axle, as is the case in the FIG. 10 option.

The following Clauses define subject matter of the present disclosure:

Clause A. An aircraft wheel comprising
a wheel axis,
a hub,
a first end structure extending radially from the hub, and
a second end structure extending radially from the hub, the second end structure being spaced apart from the first end structure in a direction along the wheel axis,
at least part of the space between the first end structure and the second end structure defining a region for receiving a tyre, and
consumable brake lining material which is directly attached to, or is integrally formed with, an outwardly facing surface of the first end structure.

Clause B. An aircraft wheel according to Clause A, wherein
further consumable brake lining material is directly attached to, or is integrally formed with, an outwardly facing surface of the second end structure.

Clause C. An aircraft wheel and a brake assembly, wherein the brake assembly comprises a first part comprising at least one of a disc of brake material and a disc-shaped pressure plate and a second part comprising a disc of brake material, and wherein the main body of the wheel is disposed between the first part of the brake assembly and the second part of the brake assembly.

Clause D. An aircraft wheel and a brake assembly according to Clause C, wherein at least one said disc of brake material is directly attached to, or is integrally formed with, an outwardly facing surface of the main body of the wheel.

Clause E. An aircraft wheel and a brake assembly including an aircraft wheel according to Clause A or Clause B.

Clause F. An aircraft wheel and a brake assembly according to Clause D or Clause E, wherein the brake material attached to the outwardly facing surface is planar for more half of the surface area covered.

Clause G. An aircraft wheel and a brake assembly according to any of Clauses C to F, wherein the majority of the volume of the material from which the main body of the wheel is made is a composite material.

Clause H. An aircraft wheel and a brake assembly according to Clause G, wherein the composite material is a carbon fibre composite material.

Clause I. An aircraft wheel and a brake assembly according to any of Clauses C to F, wherein the majority of the volume of the material from which the main body of the wheel is made is an aluminium alloy material.

Clause J. An aircraft wheel and a brake assembly according to any of Clauses C to I, wherein at least 75% of the volume of the main body of the wheel is formed from one or two monolithic wheel portions (which for example act as a heat sink during braking).

Clause K. An aircraft wheel and a brake assembly according to Clause J, wherein the main body of the wheel is formed as one monolithic structure.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

More brake material may be provided within the wheel, meaning that brake linings need not be replaced every time the tyre is replaced/re-tread. Such a design, whilst not providing as great a reduction in mass, may nevertheless provide time-savings, as the inspection of the brakes may be performed in the workshop as a part of the routine maintenance of the tyre (instead of having to perform brake inspection while the brake assembly remains in situ on the aircraft landing gear, as is conventional in the art).

It may be that some of the rotors of a brake pack are provided with brake material. It may be that none of the stators are lined with brake material.

The wheel body of FIGS. 10 to 12 may be formed from two monolithic portions (a two-part wheel body). The brake lining material directly attached to the wheel body of FIGS. 10 and 11 may be formed integrally with the body of the wheel. The brake lining material may be mechanically attached directly on the wheel body surface.

The function of the pressure transfer device described above could be performed by means of a compressible member which is arranged to compress in a substantially linear fashion. The pressure transfer device compresses, under the action of the hydraulic brake actuator, in the direction parallel to the wheel axis and to the axis of the rotors and stators. The pressure transfer device includes two push plates effectively, an inner push plate and an outer push plate. In the inactive state, the inner push plate is located directly adjacent to the inner brake pack, whereas the outer push plate is set back from the outer brake pack. The inner push plate pushes against the inner brake pack which provides normal braking as soon as any non-negligible brake pressure is applied. As the pressure increases the inner push plate continues to push against the inner brake pack while the outer push plate moves progressively closer to the outer brake pack. At a certain threshold of brake pressure, the outer push plate will contact and start to push against the outer brake pack such that combined braking by means of both inner and outer brake packs commences. Alternatively, the pressure transfer device could be a simple spring type mechanism that gradually engages the outer brake pack as the brake pressure increases so that combined braking is performed by means of both inner and outer brake packs in advance of emergency braking demands.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The term 'or' shall be interpreted as 'and/or' unless the context requires otherwise.

The invention claimed is:

1. An aircraft wheel and a brake assembly comprising a first portion and a second portion configured such that the first portion of the brake assembly is provided as part of the wheel and removable therewith, wherein the second portion of the brake assembly is in use mounted on landing gear structure adjacent to the wheel,
the first portion being operable separately from the second portion to provide braking and dissipate energy at a first level, and
both the first portion and second portion being operable together to provide braking and dissipate energy at a second level, the second level being higher than the first.

2. The aircraft wheel and a brake assembly according to claim 1, wherein the first portion of the brake assembly has a first mass of consumable brake lining material, the mass being at least 1 kg, and the second portion of the brake assembly has a second mass of consumable brake lining material, the second mass being greater than the first mass.

3. The aircraft wheel and a brake assembly according to claim 1, wherein the aircraft wheel and the brake assembly are arranged to apply braking in response to a received braking demand such that below a first threshold level of braking demand, the first portion applies braking to the wheel but the second portion either does not apply braking to the wheel or applies braking at a lower level, and such that above a second threshold level of braking demand, the second threshold level being the same or higher than the first threshold level, the first portion applies braking to the wheel and the second portion applies more braking to the wheel.

4. The aircraft wheel and a brake assembly according to claim 3, wherein the second portion is configured to apply braking to the wheel in the event of a maximum energy rejected take-off.

5. The aircraft wheel and the brake assembly according to claim 4, wherein the first portion of the brake assembly is insufficient of itself to meet the demands of a maximum energy rejected take-off.

6. The aircraft wheel and a brake assembly according to claim 1, wherein the first portion comprises at least one stator and at least one rotor and the second portion comprises at least one stator and at least one rotor, the rotors and stators of the first and second portions being arranged in series.

7. The aircraft wheel and a brake assembly according to claim 1, wherein the first portion and the second portion of the brake assembly are arranged to be activated by the same actuator.

8. The aircraft wheel and a brake assembly according to claim 7, wherein the same actuator is configured to activate the braking provided by the first portion of the brake assembly via a compressible pressure transfer device which above a threshold pressure compresses in a way that causes the actuation of the second portion of the brake assembly.

9. A method of applying braking to the aircraft wheel and the brake assembly of claim 1, comprising applying braking to the wheel, in response to a rejected take-off, using both the first portion and the second portion so as to provide braking and dissipate energy at a second level, the second level being higher than the first level.

10. A method according to claim 9, wherein the first portion of the brake assembly is in the form of a brake pack that forms an integrated part of the wheel, and the second portion of the brake assembly is in the form of a brake pack that is mounted on the landing gear and which does not form an integrated part of the wheel.

11. The method of braking according to claim 10, wherein the first brake pack has less brake material than the second brake pack and the first and second brake packs are arranged to provide braking of the wheel by the first brake pack only.

12. The method of braking according to claim 9, wherein the method includes a step of providing braking of the wheel by use of the first portion of the brake assembly and without use of the second portion of the brake assembly.

13. A method of applying braking to a wheel of a landing gear of an aircraft, in response to a rejected take-off, the method including operating both a first portion and a second portion of a brake assembly, the first portion being in the form of a brake pack that forms an integrated part of the wheel, and the second portion being in the form of a brake pack that is mounted on the landing gear and which does not form an integrated part of the wheel.

14. The method of applying braking according to claim 13, wherein the first portion of the brake assembly is operable separately from the second portion to provide braking and dissipate energy at a first level, and the first portion and second portion when operating together in response to the rejected take-off, provide braking and dissipate energy at a second level, the second level being higher than the first level.

* * * * *